No. 853,226. PATENTED MAY 14, 1907.
F. CONRAD & W. M. BRADSHAW.
ALTERNATING CURRENT ELECTRICAL APPARATUS.
APPLICATION FILED MAY 27, 1904. RENEWED JAN. 26, 1905.
3 SHEETS—SHEET 2.
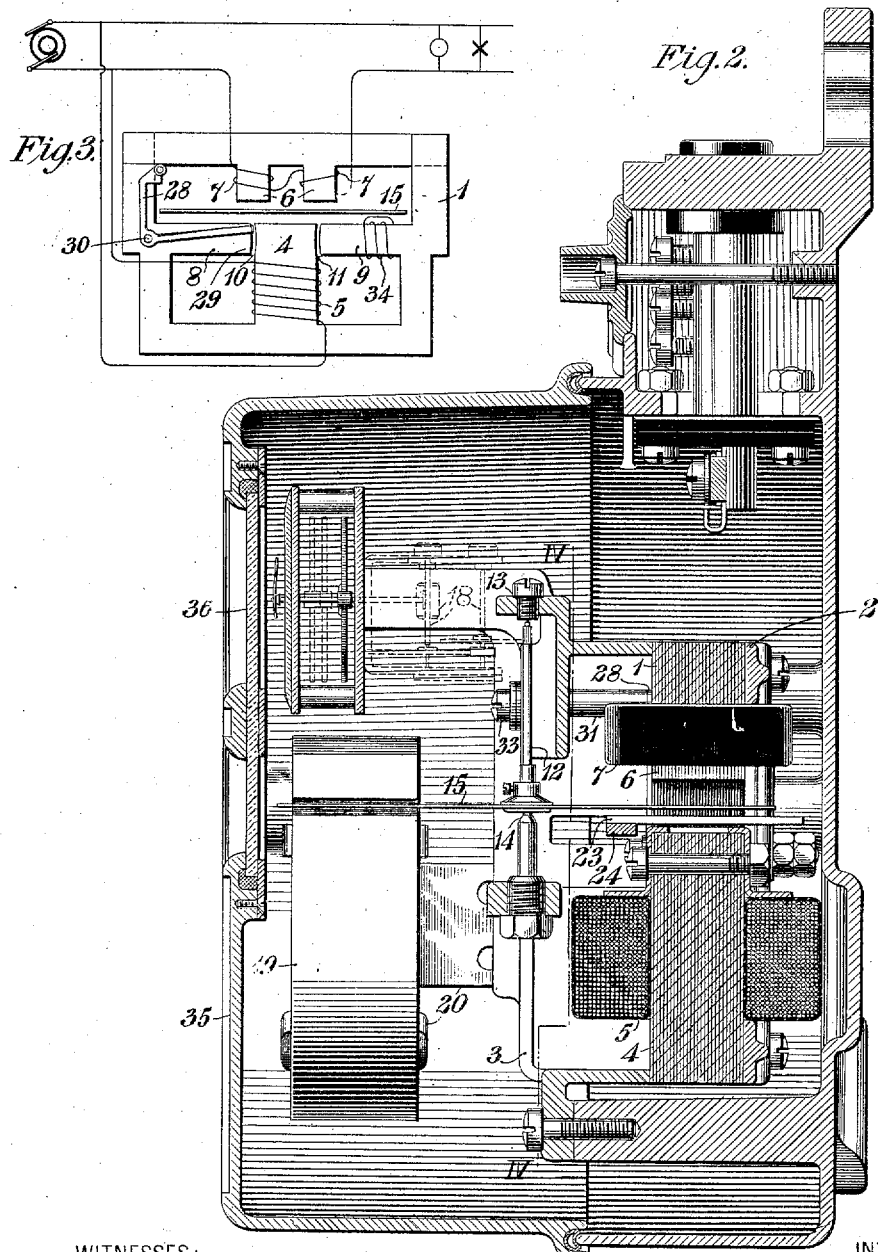
WITNESSES:
C. L. Belcher
Otto S. Schairer
INVENTORS
Frank Conrad
& William M. Bradshaw
BY
Wiley &Carr
ATTORNEY No. 853,226. PATENTED MAY 14, 1907.
F. CONRAD & W. M. BRADSHAW.
ALTERNATING CURRENT ELECTRICAL APPARATUS.
APPLICATION FILED MAY 27, 1904. RENEWED JAN. 26, 1905.

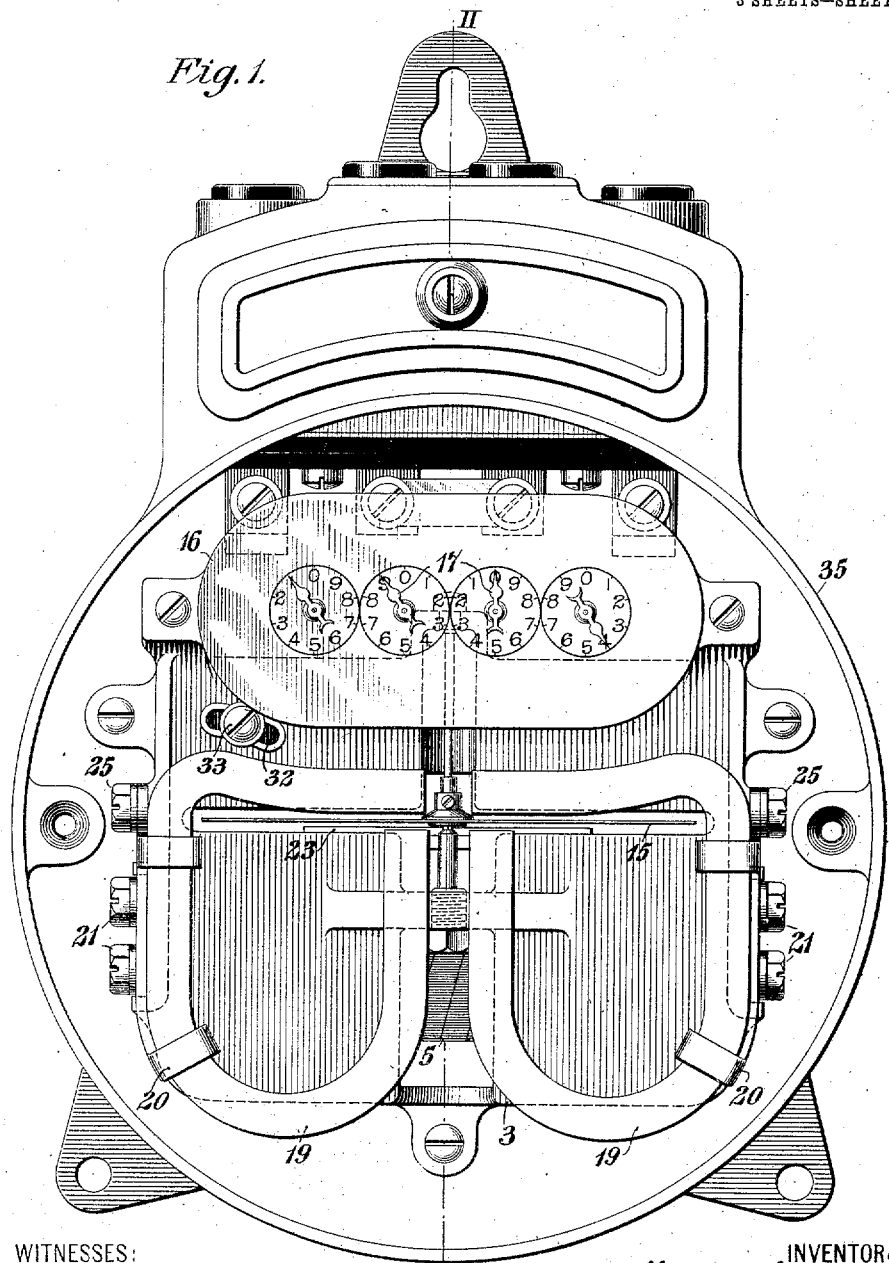

3 SHEETS—SHEET 3.

WITNESSES:
C. L. Belcher
Otto S. Schairer.

INVENTORS
Frank Conrad
& William M. Bradshaw
BY
Wesley G. Carr
ATTORNEY

UNITED STATES PATENT OFFICE.

FRANK CONRAD, OF EDGEWOOD PARK, AND WILLIAM M. BRADSHAW, OF WILKINSBURG, PENNSYLVANIA, ASSIGNORS TO WESTINGHOUSE ELECTRIC & MANUFACTURING COMPANY, A CORPORATION OF PENNSYLVANIA.

ALTERNATING-CURRENT ELECTRICAL APPARATUS.

No. 853,226.  Specification of Letters Patent.  Patented May 14, 1907.

Application filed May 27, 1904. Renewed January 26, 1905. Serial No. 242,735.

*To all whom it may concern:*

Be it known that we, FRANK CONRAD and WILLIAM M. BRADSHAW, citizens of the United States, and residents, respectively, of Edgewood Park and of Wilkinsburg, in the county of Allegheny and State of Pennsylvania, have invented a new and useful Improvement in Alternating-Current Electrical Apparatus, of which the following is a specification.

Our invention relates to means for transforming alternating current electrical energy into mechanical energy, and particularly to electrical measuring instruments embodying such means, though susceptible of more general application.

Our invention has for its object to provide an instrument of the character indicated which shall be simple and compact in construction and efficient in operation and in which a sufficiently high torque shall be exerted upon the rotatable member to insure substantially accurate measurement of the energy of distributing systems throughout a wide range of variation in the loads upon such systems, when utilized for measuring such energy.

A further object of our invention is to provide an instrument which shall be accurate in operation on a circuit of any power factor, and which shall insure the required condition of exact quadrature relation between the current and the electromotive force fluxes in the instrument in a simple and efficient manner.

If our instrument is utilized in a registering meter, the rate of rotation of the armature may be maintained almost exactly proportional to the amount of energy traversing the circuit by means of a simple, easily adjustable and novel device which compensates for the friction between its relatively movable parts.

Figure 4:
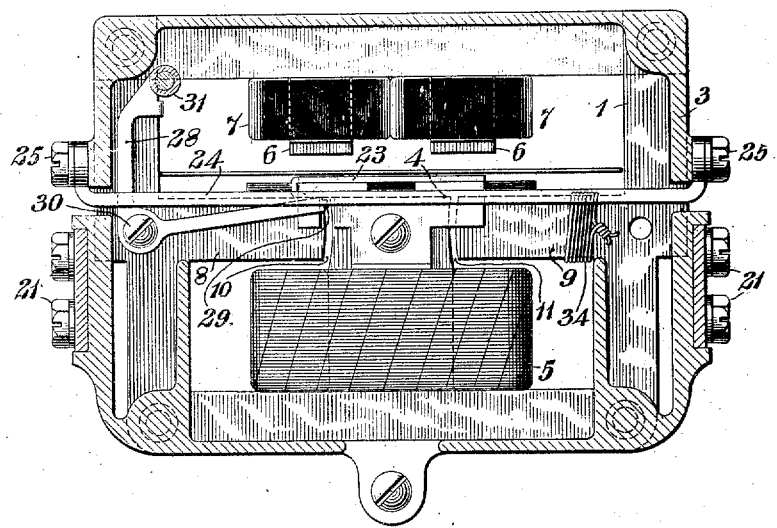
Figure 5:
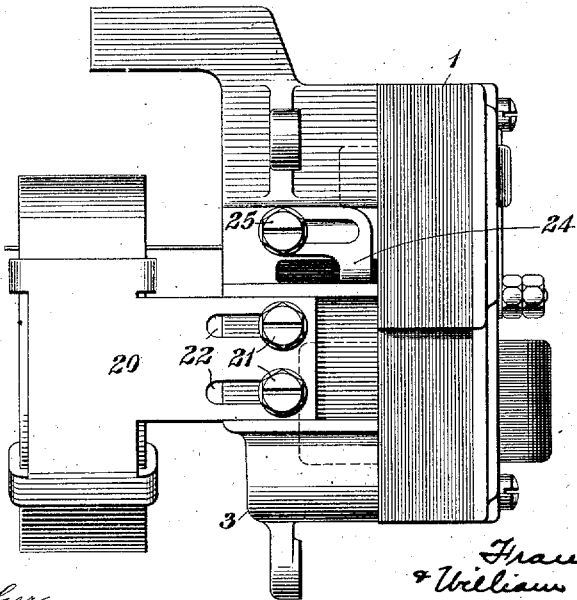

Our invention is illustrated in the accompanying drawings, in which Figure 1 is a face view of an instrument constructed in accordance therewith. Fig. 2 is a view, in section, on line II—II of Fig. 1. Fig. 3 is a diagrammatic view showing the instrument properly connected to a distributing circuit. Fig. 4 is a view, in section, on line IV—IV of Fig. 2, showing only the operating parts of the instrument, and Fig. 5 is a side view of the operating parts of the instrument.

The iron core 1 comprises laminæ of the proper form clamped together between a plate 2 of any suitable material and a frame 3, preferably of magnetic material, which supports the core and the operating parts of the meter. The core comprises a main frame or body portion of approximately rectangular shape having an inwardly projecting pole piece 4 at one side for the shunt winding 5, two inwardly projecting pole pieces 6 at the opposite side for the series winding 7, and two pieces 8 and 9 that project inwardly from the ends, at right angles to the pole pieces 4 and 6. Air gaps 10 and 11 of the proper width are formed between the projections 8 and 9 and the main pole piece 4, these air gaps being of curved form, for a purpose which will be hereinafter specified. The faces of the pole pieces 6 are respectively opposite the air gaps 10 and 11, and the air gap formed between the faces of the pole pieces 6 and the face of the pole piece 4 is substantially at right angles to the air gaps 10 and 11.

Mounted upon a shaft 12 which is journaled in suitable bearings 13 and 14, is a disk 15 of any suitable conducting material which projects into the air gap between the faces of the pole pieces 4 and 6, the number of revolutions made by the disk being registered upon a dial 16 by pointers 17 connected, through a train of gears 18, to the shaft 12.

In order to govern the rotation of the disk 15 and cause its speed to be proportional to the amount of energy traversing the circuit, we provide two permanent magnets 19 of such form as to most satisfactorily perform the desired function and, at the same time, permit of a simple and compact construction. The magnets are supported by brackets 20 which are secured to the framework 3 by set-screws 21 and are adjustable parallel to the disk by means of the set-screws and elongated slots 22 in the brackets through which the screws project.

Means for effecting exact quadrature relation between the two magnetic fields when the motor is operating on circuits having a power factor of unity comprises a plate 23 of suitable conducting material supported parallel with the disk 15 and adjacent thereto, the position of which is radially adjustable with respect to the disk so as to intercept more or less of the flux between the pole pieces 4 and 6. This plate 23 is supported by a bar 24 having laterally-bent and slotted ends which are secured, by means of set-screws 25, to the frame 3. (See Figs. 4 and 5.)

The shunt winding 5 comprises a large number of turns of comparatively small wire, in order that it may produce an intense magnetization of the pole piece 4. The greater part of the flux produced by the shunt winding traverses the magnetic circuit of relatively low reluctance through the polar projections 4, 8 and 9 and the intervening connecting portions and, consequently, effects a displacement of the current with respect to the electromotive force of nearly 90°.

The series winding comprises two coils 7 so connected that they produce a flux from one pole piece 6 to the other, the greater portion of which passes through the disk 15 and coöperates with that portion of the shunt flux which passes through the disk to produce a torque upon that member. Exact quadrature relation between those portions of the fluxes produced by the shunt and the series windings which pass through the disk is attained, as before described, by a proper adjustment of the plate 23.

In order that the friction between relatively movable parts of instruments of this character may not prevent accurate registration of the amount of energy supplied to the instrument during a specific interval of time, we provide a compensating means which comprises a closed coil 28 consisting of a single turn of proper dimensions and of suitable conducting material having one side 29 located in the air gap 10 which is between the projection 8 and the pole piece 4. The position of the side 29 in the gap is adjustable, in order that the coil may surround more or less of the shunt flux across said gap. In order to effect the desired adjustment, the coil is pivotally supported at 30 and is provided with a boss 31 adjacent to a slot 32 in the frame 3, through which projects an adjusting and locking set-screw 33. Since the coil 28 surrounds a part of the shunt flux that crosses the gap 10, that side of the shunt-magnet pole will have a different field strength or a different degree of magnetization from the other side, and by adjusting the coil 28 so that it surrounds more or less of this flux, the differences in the degrees of magnetization of the two sides of the pole piece may be so adjusted that the speed of rotation of the disk will be increased just sufficiently to compensate for the retardation due to friction.

In order that the coil 28 may have a maximum range of adjustment, the core projection 9 is provided with a comparatively high resistance, closed winding 34 of such proportions that when the side 29 of the coil 28 is approximately in the middle of the gap 10, the two sides of the pole 4 are equally magnetized and no compensation for friction is provided. If the side 29 is moved in the one direction from the said middle position, the speed of the disk 15 will be increased, and if moved in the opposite direction, the speed will be decreased.

All of the above-mentioned parts of the instrument are mounted in and inclosed by a suitable case 35 which is provided with a glass plate 36 directly in front of the dial on which is registered the number of rotations of the disk and with suitable terminals for connecting the meter to the external circuit in substantial accordance with the usual practice.

While we have shown and described our instrument as adapted for registering the amount of energy which traverses a circuit during a specific interval of time, it is evident that without materially altering the essential details of the meter it may be modified so as to indicate the amount of energy which is traversing the circuit at any instant, or to record the energy values at all times. Other details may also be varied within considerable limits and we do not wish our invention limited except by such restrictions as may be imposed by the prior art.

We claim as our invention:

1. In an alternating current motor, a core comprising a main polar projection, projections of different polarity between which and the aforesaid polar projection there are air gaps, and other polar projections having their faces respectively opposite to the said air gaps.

2. In an alternating current motor, the combination with a core comprising a main polar projection, projections of different polarity between which and the aforesaid polar projection there are air gaps, and other polar projections having their faces respectively opposite to the said air gaps, of a closed coil that is partially located in one of said gaps, said coil being adjustable so as to inclose more or less of the flux across the gap.

3. In an alternating current motor, the combination with a core comprising a main polar projection, projections of different polarity between which and the aforesaid polar projection there are air gaps, and other polar projections having their faces respectively opposite to the said air gaps, of a closed coil that is partially located in one of said gaps, means for adjusting said coil so as to inclose more or less of the flux across the gap, and a closed coil on the projection at the opposite side of the main projection.

4. In an alternating current motor, the combination with a core comprising a main polar projection, projections of different polarity between which and the aforesaid polar projection there are air gaps, and other polar projections having their faces respectively opposite to the said air gaps, of a low-resistance, closed coil that is partially located in one of said gaps, means for adjusting said coil so as to inclose more or less of the flux across the gap, and a high-resistance, closed coil on the projection at the opposite side of the main projection.

5. In an alternating current motor, a magnetic circuit comprising a body portion, a main polar projection at one side, projections at the ends between which and the aforesaid projection there are air gaps, and polar projections having their faces respectively opposite to the said air gaps.

6. In an alternating current motor, a magnetic circuit comprising a body portion, a main polar projection at one side, projections at the ends between which and the aforesaid projection there are air gaps, and polar projections having their faces respectively opposite to the said air gaps, in combination with a closed coil that is partially located in one of said air gaps, said coil being adjustable in order that it may inclose more or less of the flux across the gap.

7. In an alternating current motor, a magnetic circuit comprising a body portion, a main polar projection at one side, projections at the ends between which and the aforesaid projection there are air gaps, and polar projections having their faces respectively opposite to the said air gaps, in combination with a closed coil that is partially located in one of said air gaps, said coil being adjustable in order that it may inclose more or less of the flux across the gap, and a closed winding about the projection which is at the opposite side of the main projection.

8. In an alternating current motor, a magnetic circuit comprising a frame or body portion, a main polar projection at one side, projections at the ends between which and the sides of the aforesaid main projection there are comparatively small air gaps, and other polar projections having their ends respectively opposite to said small air gaps and separated from the said parts by a larger air gap.

9. In an alternating current motor, a magnetic circuit comprising a frame or body portion, a main polar projection at one side, projections at the ends between which and the sides of the aforesaid main projection there are comparatively small air gaps, and other polar projections having their ends respectively opposite to said small air gaps and separated from the said parts by a larger air gap, in combination with a closed coil that is partially located in one of said small air gaps, its position being adjustable so as to inclose more or less of the flux across the gap.

10. In an alternating current motor, a magnetic circuit comprising a frame or body portion, a main polar projection at one side, projections at the ends between which and the sides of the aforesaid main projection there are comparatively small air gaps, and other polar projections having their ends respectively opposite the said small air gaps and separated from the said parts by a larger air gap, in combination with a closed coil that is partially located in one of said small air gaps, its position being adjustable so as to inclose more or less of the flux across the gap, and a closed coil around the projection which is at the opposite side of the main projection.

11. In an alternating current motor, the combination with shunt and series windings, of a core comprising a main polar projection for the shunt winding, projections between which and the main projection there are air gaps, and polar projections having their ends respectively opposite the air gaps and upon which the series coils are located so as to produce a flux from one of the last named polar projections to the other.

12. In an alternating current motor, the combination with shunt and series windings, of a core comprising a main polar projection for the shunt winding, projections between which and the main projection there are air gaps, and polar projections for the series winding the ends of which are respectively opposite said air gaps.

13. In an alternating current motor, the combination with shunt and series windings and a rotatable disk, of a core comprising a main polar projection for the shunt winding having its face adjacent to the disk, projections parallel with the disk between which and the main projection there are air gaps, and polar projections for the series winding on the opposite side of the disk the faces of which are adjacent to the disk and are respectively opposite the said air gaps.

14. In an alternating current motor, the combination with shunt and series windings and a rotatable disk, of a core comprising a main polar projection for the shunt winding having its face adjacent to the disk, projections parallel with the disk between which and the main projection there are air gaps, and polar projections on the opposite side of the disk the faces of which are adjacent to the disk and are respectively opposite the said air gaps, the coils of the series winding being located thereon so as to produce a flux from one pole to the other.

15. In an alternating current motor, the combination with shunt and series windings and a rotatable disk, of a core comprising a main polar projection for the shunt winding having its face adjacent to the disk, projections parallel with the disk between which and the main projection there are air gaps, polar projections for the series winding on the opposite side of the disk the faces of which are adjacent to the disk and are respectively opposite the said air gaps, and a sheet of conducting material that is located between the shunt and series pole pieces, adjacent to the disk, and is radially adjustable with reference thereto.

16. In an alternating current motor, the combination with shunt and series windings and a rotatable disk, of a core comprising a main polar projection for the shunt winding having its face adjacent to the disk, projections parallel with the disk between which and the main projection there are air gaps, polar projections for the series winding on the opposite side of the disk the faces of which are adjacent to the disk and are respectively opposite the said air gaps, and a closed coil that is partially located in one of said air gaps and is adjustable in order that it may intercept more or less of the flux across the gap.

17. In an alternating current motor, the combination with shunt and series windings and a rotatable disk, of a core comprising a main polar projection for the shunt winding having its face adjacent to the disk, projections parallel with the disk between which and the main projection there are air gaps, polar projections for the series winding on the opposite side of the disk the faces of which are adjacent to the disk and are respectively opposite the said air gaps, a closed coil that is partially located in one of said air gaps and is adjustable in order that it may intercept more or less of the flux across the gap, and a closed coil that surrounds the projection at the opposite side of the main shunt projection.

18. In an alternating current motor, the combination of shunt and series windings, a core having polar projections that are magnetized respectively by the shunt and by the series windings, the magnetic circuit for the shunt winding containing two air gaps, and a closed-circuit compensating device that is partially located in one of said air gaps and is adjustable therein.

19. In an alternating current motor, the combination with shunt and series windings, of a core providing an iron circuit for the shunt flux that is interrupted at two points, and a closed-circuit, friction-compensating device that is adjustable in position so as to inclose more or less of the shunt flux at one of the points of interruption.

20. In an alternating current motor, the combination with shunt and series windings, of a magnetic circuit for the shunt winding which is mainly of low reluctance but which has two high reluctance portions, and a closed-circuit member that is adjustable in position to inclose more or less of the shunt flux across one of the high reluctance portions of the magnetic circuit.

21. In an alternating current motor, the combination with shunt and series windings, of a core having a plurality of polar projections at least one of which is magnetized by the shunt winding and two others of which are symmetrically located with reference thereto, and means for varying the amount of shunt flux through one of said symmetrically located polar projections.

In testimony whereof, I have hereunto subscribed my name this 21st day of May, 1904.

FRANK CONRAD.

Witnesses:
   PAUL MACGAHAN,
   BIRNEY HINES.

In testimony whereof, I have hereunto subscribed my name this 25th day of May, 1904.

WM. M. BRADSHAW.

Witnesses:
   JOS. W. ALEXANDER,
   BIRNEY HINES.